Aug. 26, 1969  E. HOLZ  3,463,211

CUTTING APPARATUS

Filed March 20, 1967

3,463,211
CUTTING APPARATUS
Ernst Holz, Hauptstrasse 76, Heidenheim-
Schnaitheim, Germany
Filed Mar. 20, 1967, Ser. No. 625,560
Claims priority, application Germany, Mar. 23, 1966,
H 58,877
Int. Cl. A22c *17/02*
U.S. Cl. 146—78             9 Claims

ABSTRACT OF THE DISCLOSURE

The first cutting unit is provided with at least one elongated first blade against which material to be cut is fed in a given direction of advancement. A second cutting unit is arranged adjacent the first cutting unit downstream thereof and is provided with at least one elongated second blade inclined with reference to the first blade. Guide means is arranged for guiding material to be cut in the given direction and in a predetermined path and this guide means defines at least in the region intermediate the upstream edge of the first cutting unit and the downstream edge of the second cutting unit a plurality of channels each of which is adapted to receive a portion of the material which is divided by the first cutting unit, and to thereupon guide such portion toward and beyond the second cutting unit for further subdividing by the latter.

---

Background of the invention

The present invention relates to a cutting apparatus in general, and more particularly to a cutting apparatus which is especially well suited for cutting bacon and other foodstuffs. Still more particularly, the present invention relates to a cutting apparatus for dicing of various materials.

In cutting apparatus of this general type which is known from the art, and particularly in cutting apparatus for dicing of various materials, it has heretofore been a source of dissatisfaction that cuts are frequently not as clean and straight as is desirable, particularly in commercial production. This is especially bothersome when relatively soft materials, such as cooked foodstuffs and the like, including bacon, are to be diced. Under such circumstances the material to be cut, which is advanced into engagement with the cutting edges of various blades, is deformed by contact with these cutting edges even if the latter are very sharp and, as a result of such deformation, the cuts which are then made in the material are not straight. This undesirable condition is aggravated even further if, to attain greater economy of operation, the rate at which the material is advanced is increased.

It has therefore long been a desire of industry to have available cutting apparatus which is not possessed of these disadvantages.

Prior constructions tried to reduce or eliminate these disadvantages simply by having the cutting units arranged immediately adjacent one another. But this produced even more difficulties because mainly on account of the fact that the cutting blades should be as thin as possible the blades of the second unit were twisted and laterally deflected and thus produced even a worse cutting quality.

Summary of the invention

The present invention overcomes the above-mentioned disadvantages.

More particularly, the present invention provides a cutting apparatus which is capable of providing prefectly straight and clean cuts even in soft materials, such as for instance bacon or cooked soft foodstuffs.

The present invention provides a cutting apparatus which is inexpensive to manufacture and which is highly reliable in its operation.

To obtain the desired straight and clean cuts with the present cutting apparatus is simple and the apparatus does not require a highly skilled operator for its use.

In accordance with one feature of my invention I provide a cutting apparatus, particularly a cutting apparatus which is well suited for cutting bacon and other foodstuffs, and this apparatus includes a first cutting unit which has at least one elongated first blade against which material to be cut is fed in a given direction of advancement. My novel apparatus also comprises a second cutting unit which is arranged adjacent the first cutting unit but downstream thereof and which has at least one elongated second blade inclined with reference to the first blade. Furthermore, my novel apparatus comprises guide means which is arranged for guiding material to be cut in the aforementioned given direction in a predetermined path and which defines at least in the region intermediate the upstream edge of the first cutting unit and the downstream edge of the second cutting unit a plurality of channels each of which is adapted to receive a portion of the material which is divided by the first cutting unit, and which is further adapted to thereupon guide such portion toward and beyond the second cutting unit for further subdividing by the latter.

The novel features which are considered as characteristic for the invention are set forth in particular in the appended claims. The invention itself, however, both as to its construction and its method of operation, together with additional objects and adantages thereof, will be best understood from the following description of specific embodiments when read in connection with the accompanying drawings.

Description of the preferred embodiments

Figure 1:
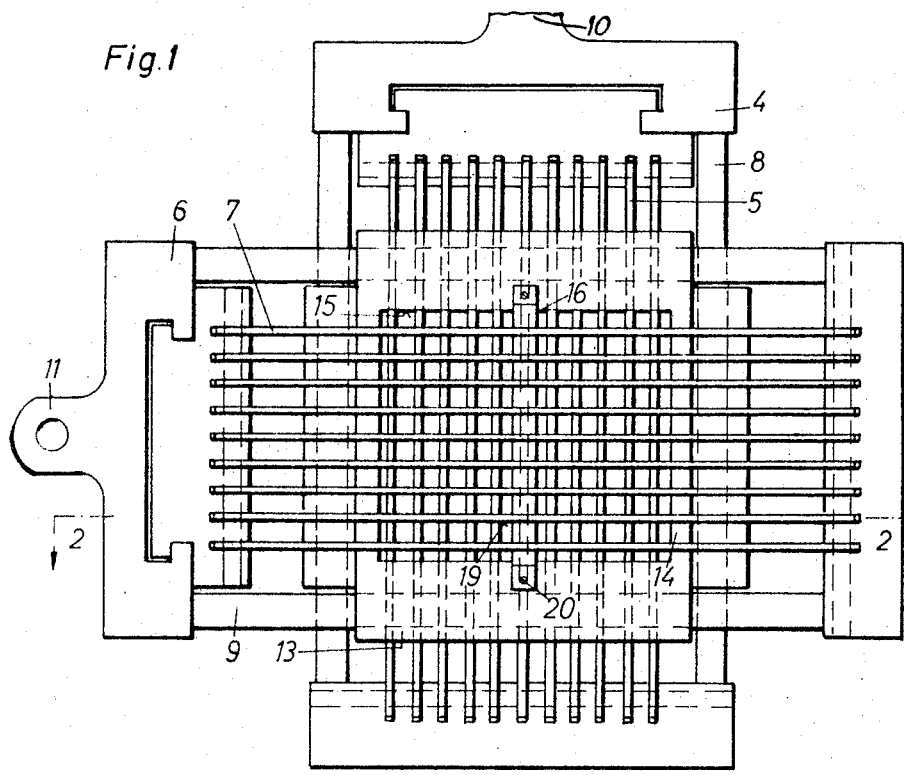
FIG. 1 is an elevational view of a cutting arrangement in accordance with the present invention, as seen from the downstream side thereof.

Discussing now the drawing in detail there will be seen that a support means 3 is provided on which there is arranged a frame 4 carrying a plurality of cutting blades 5 which are arranged, as will be discussed subsequently, for reciprocation in vertical direction as seen in the drawing. The material to be cut is advanced against the blades 5 in the direction of the arrows shown in FIG. 2 and a second frame 6 carrying a plurality of cutting blades 7 is arranged behind or downstream of the first frame 4, and the blades 7 are reciprocated in horizontal direction, also as seen with reference to the drawing. To permit the reciprocation of the frames 4 and 6, and thereby of the respective blades 5 and 7, the frames 4 and 6 are reciprocably secured by means of rods 8 and 9 which are received in corresponding apertures provided in the support 3. Eyes or apertures 10 and 11 provided on the frames 4 and 6, respectively, are engaged by a suitable drive means, many of which are well known in the art and therefore not illustrated in this disclosure, and are thus reciprocated in the sense already discussed above.

The cutting blades 5 are guided in slots 12 provided in horizontal portions 13 of the support 3, and the cutting blades 7 are similarly guided in corresponding slots provided in the vertical portions 14 of thhe support 3.

The support 3 is provided with an opening 15 which, in the illustrated embodiment, is seen to be quadratic in cross section, but which may of course be of other outline, and in which the material to be cut is guided for advancement against the blades 5 and 7, respectively. In accordance with the invention a guide means such as a guide bar 16 extends across this opening 15 and is provided with a leading end face and with two side faces which diverge from this leading end face outwardly and rearwardly in the downstream direction. This is particularly clearly shown in FIG. 2 and it will be evident that the side faces cannot only be rounded, as shown at 17, but that they also can taper conically or in another selected manner. The cutting blade 5' of the plurality of cutting blades 5, which is located upstream and in registry with the guide bar 16, is guided in a longitudinally extending slot 18 provided in the guide bar 16, and it will be seen that the rear portion of the bar 16, that is the portion facing away from the plurality of blades 5, extends in the illustrated embodiment downstream and beyond the cutting edges of the second plurality of cutting blades identified with reference numeral 7. Of course, to make this possible this portion of the guide bar 16 is provided with a plurality of slots 19 so that corresponding portions of the cutting edges of the respective cutting blades 7 extend into these slots. As shown in FIG. 1, the guide bar 16 is releasably secured to the support 3 by means of screws 20 or similar fastening means. Whereas in conventional apparatus of this type utilizing two sets of cutting blades arranged in two planes one of which is downstream of the other, the material to be cut—and particularly soft material—is deflected to and fro transversely of the direction of advancement of the material as the result of the reciprocation of the blades of the respective set of blades, thus resulting in cuts which are neither clean nor straight, this does not take place in the apparatus according to the present invention. The material to be cut is deflected sideways by the guide bar 16 which, as clearly evident in FIG. 2, has a greater transverse width than the respective cutting blades 5, and thus exerts a certain amount of lateral pressure on the material which thus reaches the blades of the second set, numbered with reference numeral 7, in a firmed condition in which it is not subject to this to and fro movement which would normally be imparted to it by the reciprocation of the blades 7. Furthermore, the fact that this "firming" takes place already as the material passes beyond the cutting blades 5 of the first set assures that another disadvantage cannot occur which is well known from prior constructions, namely the fact that laterally deflected material transmits this lateral pressure to the cutting knives of the second set, in the present instance corresponding to the cutting knives 7, and thus deforms these knives or blades in direction transversely to the direction of advancement of the material.

It is to be understood, of course, that it is not absolutely necessary that a portion of the bar 16 extend between the two sets of blades, or even downstream beyond the cutting edges of the blades 7 of the second set. However, this is an advantageous embodiment of the invention.

It is also not absolutely necessary that the guide bar 16 extend in the direction transversely, and particularly normal to the reciprocation of the blades of the second set, but again this is an advantageous arrangement of the present invention.

Figure 2:
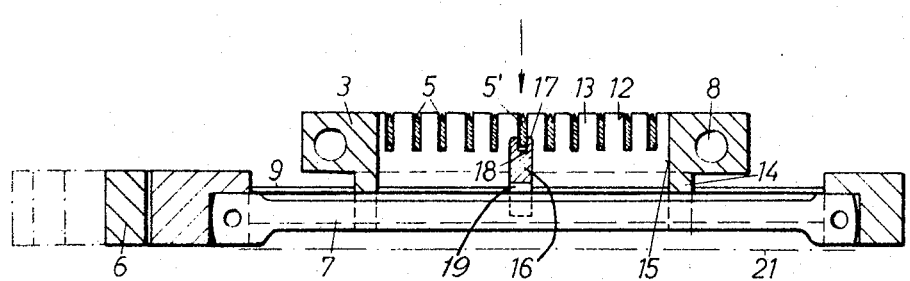
FIG. 2 is a section taken on the line II—II of FIG. 1.

It is to be understood, of course, that still another cutting means, identified with reference numeral 21 in FIG. 2 and illustrated only in a most schematic manner since it is not essential to the consideration of the present invention, is provided for carrying out the final cut necessary downstream of the second set 7 of cutting blades, in order to transform the rods which have been provided by subdivision of the material via the sets 5 and 7 of cutting blades, into the desired cubes or dice.

It will be understood that each of the elements described above, or two or more together, may also find a useful application in other types of cutting apparatus differing from the types described above.

While the invention has been illustrated and described as embodied in a cutting apparatus particularly suitable for cutting bacon and other foodstuffs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A cutting apparatus, particularly for bacon and other foodstuffs, comprising a first cutting unit having at least one elongated first blade against which material to be cut is fed in a given direction of advancement; a second cutting unit arranged adjacent said first cutting unit downstream thereof and having at least one elongated second blade extending transversely to said first blade; and guide means arranged for guiding material to be cut in such given direction in a predetermined path and defining at least intermediate the upstream edge of said first cutting unit and the downstream edge of said second cutting unit a plurality of channels each adapted to receive a portion of the material divided by said first cutting unit, and to thereupon guide such portion toward and beyond said second cutting unit for further subdividing by the latter, at least one of said blades reciprocating transversely of said predetermined path in which said material advances.

2. A cutting apparatus as defined in claim 1, wherein said guide means comprises retaining means located at opposite sides of the path of material to be cut, in two spaced planes which are parallel to one another and to such path, said guide means further comprising at least one guide bar extending normal to the path intermediate said retaining means and in a third plane parallel to said spaced planes.

3. A cutting apparatus as defined in claim 2, wherein at least said second blade reciprocates in the longitudinal direction thereof and extends transversely of said third plane.

4. A cutting apparatus as defined in claim 2, wherein said first and second blades are spaced from one another in said given direction, and wherein said guide bar is located at least partly in the space intermediate said blades.

5. A cutting apparatus as defined in claim 4, wherein said second blade reciprocates in the longitudinal direction thereof and said guide bar comprises a portion extending downstream of the cutting edge of said second blade, and wherein said portion is provided with a recess in which a corresponding portion of said second blade is received so that said guide bar does not interfere with reciprocation of said second blade.

6. A cutting apparatus as defined in claim 1, wherein said guide bar comprises two spaced side faces which converge in upstream direction with respect to the direction of advancement of material to be cut.

7. A cutting apparatus as defined in claim 1, wherein said guide bar has a leading end face extending longitudinally of said bar, said leading end face being provided with a longitudinally extending slot, and said first blade having a back portion received in said slot with the cutting edge of said first blade projecting therefrom.

8. A cutting apparatus as defined in claim 7, wherein said guide bar further has two side faces which diverge outwardly and rearwardly from said leading end face in downstream direction.

9. A cutting apparatus as defined in claim 1; further comprising support means supporting said cutting units; and releasable fastening means releasably fastening said guide bar to said support means.

References Cited
UNITED STATES PATENTS 2,219,963 10/1940 Rieder _____ 146—169 X
2,327,018 8/1943 Criner _____ 146—78

W. GRAYDON ABERCROMBIE, Primary Examiner

U.S. Cl. X.R.

146—151